Dec. 25, 1923. 1,478,893
C. F. ERICKSON
RIM FOR VEHICLE WHEELS
Filed Feb. 11, 1922
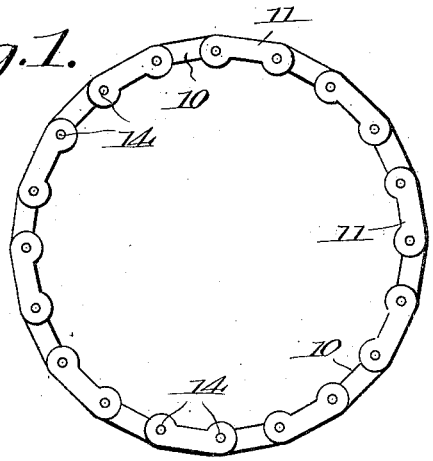
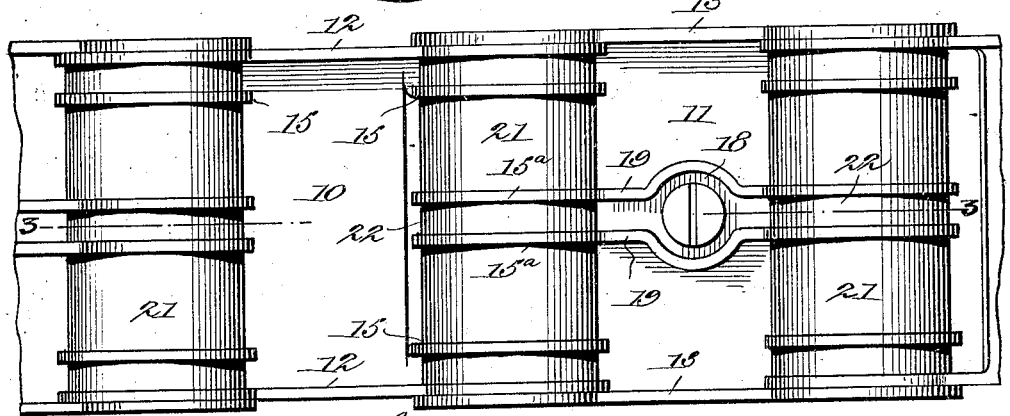
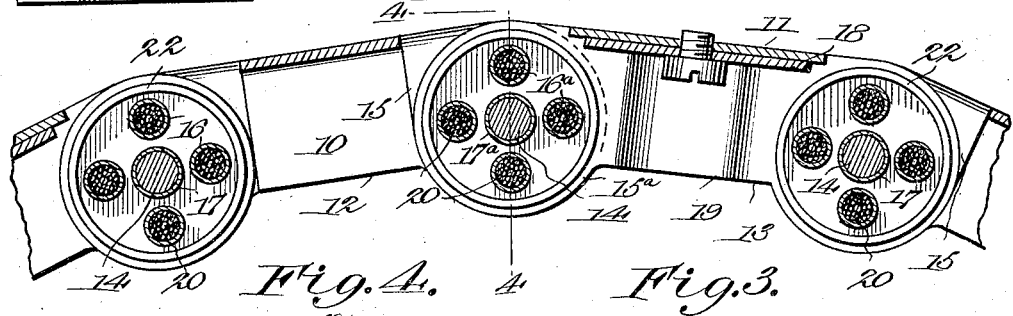
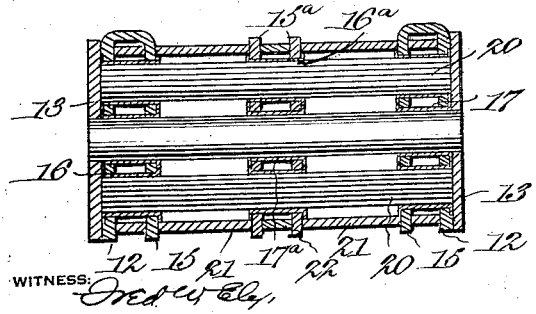
Charles F. Erickson, INVENTOR
BY Victor J. Evans ATTORNEY Patented Dec. 25, 1923.

1,478,893

UNITED STATES PATENT OFFICE.

CHARLES F. ERICKSON, OF BROOKLYN, NEW YORK.

RIM FOR VEHICLE WHEELS.

Application filed February 11, 1922. Serial No. 535,872.

*To all whom it may concern:*

Be it known that I, CHARLES F. ERICKSON, a subject of the King of Sweden, residing at Brooklyn, in the county of Kings and State of New York, have invented new and useful Improvements in Rims for Vehicle Wheels, of which the following is a specification.

This invention relates to rims for vehicle wheels and particularly to rims for wheels of the type shown and described in my prior Patent #1,188,165, dated June 20th, 1916.

The principal purpose of the present invention is to produce a rim which shall be resilient so as to withstand shocks, and at the same time such that the shocks are not entirely sustained by the springs, and that the metal is not subjected to a compression in the direction of the grain, whereby the crystallizing of the metal has been greatly reduced or perhaps entirely eliminated.

Another object is to produce a device of this nature which shall be simple of construction, easy to manufacture, and highly efficient for the purpose for which it is designed.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1, is a side elevation of my improved rim.

Figure 2, is a fragmentary interior view of a portion of a rim.

Figure 3, is a section taken substantially on line 3—3 of Figure 2.

Figure 4, is a section on line 4—4 of Figure 3.

Like characters of reference refer to like parts in all views.

Referring to the drawing in detail, the rim comprises a plurality of alternate blocks 10 and 11, which have respective side flanges 12 and 13. Each adjacent pair of blocks 10 and 11 are connected by a pivot bolt 14 so that they may be said to be hingedly secured together. The flanges 12 and 13 are provided with ears 15, supporting a plurality of bushings 16, for the springs which will be presently described, and also a bushing 17 through which the pivot pin 14, passes.

Secured to each member 11, at its center is a member 18, having its edges bent up to form flanges 19, the ends of which form ears 15ª, similar to the aforementioned ears 15 and connected by bushings 16ª and 17ª.

A plurality of spring steel wires 20, pass through the bushings 16 and 16ª, and are held in place by the ends of the flanges 13. It will be seen that when it is attempted to move members 10 and 11 relatively on the pivot 14, all of the wires 20 at that joint must be tensioned accordingly, and that as soon as stress is removed, the wires 20 force the elements 10 and 11, to their former relationship. The wires and joints may be covered by sheathing 21 and 22, if desired.

It will now be seen that any shock received by the rim will not be lengthwise of the grain but will be on the flat surface of the members 10 and 11 and that the shock will not be sustained entirely by the springs.

While I have described what I deem to be the most desirable embodiment of my invention, it is obvious that many of the details may be varied without in any way departing from the spirit of my invention, and I therefore do not limit myself to the exact details of construction herein set forth, nor to anything less than the whole of my invention, limited only by the appended claims.

What is claimed as new is:—

1. A rim embodying a plurality of blocks, pivots connecting the blocks together and springs connected with said blocks and capable of motion about the axes of the connecting pivots of said blocks.

2. A rim embodying a plurality of blocks, pivots connecting the adjacent blocks together to form hinges, yieldable structures lying parallel with the pivots of the hinges and capable of motion about said pivots, said structures being respectively connected with said blocks so that the structures are placed under tension upon relative movement of said blocks.

3. A rim comprising a plurality of pivotally connected blocks and a plurality of elastic structures connected with said blocks and positioned with respect to the pivots of said blocks so that under the application of stress thereto their deformation from normal condition will be effected when the blocks are moved relatively on their pivots, and the structures will be placed under tension for returning the blocks to their normal relative positions when the stress is removed.

4. A vehicle rim comprising a plurality of pivotally connected blocks, and a plurality of resilient means at each pivotal connection, each resilient means comprising a plurality of springs.

5. A resilient rim comprising a plurality of pivotally connected blocks, certain of said blocks being formed at opposite edges with pairs of apertured ears connected by bushings.

6. A resilient rim comprising a plurality of pivotally connected blocks, certain of said blocks being formed at opposite edges with pairs of apertured ears connected by bushings, and a plurality of springs passing through each of said bushings.

7. A resilient rim comprising a plurality of blocks, pivot pins connecting the blocks together, flanged members carried by said blocks, said members having ears through which the pivot pins of the adjacent blocks extend, bushings associated with said ears and the adjacent blocks, and springs operatively connecting the ears with said blocks to render the blocks yieldable at their pivotal points.

8. A resilient rim comprising a plurality of pivotally connected blocks, flanged members removably connected to certain of said blocks, said flanged members being formed with a plurality of registering openings in their flanges, and a plurality of springs in each of said openings.

9. A resilient rim comprising a plurality of pivotally connected blocks, flanged members removably connected to certain of said blocks, said flanged members being formed with a plurality of registering openings in their flanges, and a bundle of spring wires in each of said openings.

In testimony whereof I have affixed my signature.

CHARLES F. ERICKSON.